(12) United States Patent
Prévost

(10) Patent No.: US 6,748,933 B2
(45) Date of Patent: Jun. 15, 2004

(54) ELECTROSTATIC FLUID CONDITIONER

(76) Inventor: Jacques Prévost, 17 rue Caron, St. Eustache, Quebec (CA), J7P 4T7

( * ) Notice: Subject to any disclaimer, the term of this patent is extended or adjusted under 35 U.S.C. 154(b) by 101 days.

(21) Appl. No.: 10/110,231

(22) PCT Filed: Aug. 23, 2001

(86) PCT No.: PCT/CA01/01202
§ 371 (c)(1),
(2), (4) Date: Apr. 23, 2002

(87) PCT Pub. No.: WO02/16024
PCT Pub. Date: Feb. 28, 2002

(65) Prior Publication Data
US 2002/0152674 A1 Oct. 24, 2002

(30) Foreign Application Priority Data
Aug. 23, 2000 (GB) .................................. 0020838

(51) Int. Cl.⁷ .............................................. F02M 27/04
(52) U.S. Cl. ..................................................... 123/538
(58) Field of Search .............................. 123/536, 537, 123/538; 205/697; 252/175

(56) References Cited

U.S. PATENT DOCUMENTS

| 3,976,726 | A |   | 8/1976 | Johnson |         |
|-----------|---|---|--------|---------|---------|
| 4,069,665 | A | * | 1/1978 | Bolasny | 123/538 |
| 5,134,985 | A | * | 8/1992 | Rao     | 123/538 |
| 5,517,975 | A |   | 5/1996 | Iwata   |         |

FOREIGN PATENT DOCUMENTS

| DE | 4309396 A1    | 9/1993  |
| EP | 0894969 A2    | 2/1999  |
| GB | 2290110 A     | 12/1995 |
| WO | WO 92/13187 A1| 8/1992  |
| WO | WO 97/14882 A1| 4/1997  |
| WO | WO 00/15957 A1| 3/2000  |

* cited by examiner

Primary Examiner—Marguerite McMahon
(74) Attorney, Agent, or Firm—Robert A. Wilkes; Shapiro Cohen

(57) ABSTRACT

A method and apparatus for conditioning fluid flowing through a conduit in which two coils (50,60) are coiled around the conduit at different locations and connected to a circuit (40) which generates square wave signals which are alternately fed to the two coils (50, 60). The frequency of the square wave is ramped repeatedly from 1.5 Khz to 60 Khz.

35 Claims, 3 Drawing Sheets

ELECTROSTATIC FLUID CONDITIONER

FIELD OF THE INVENTION

The present invention relates to electrostatic fluid treatment and, more particularly, to the treatment of fuels as well as liquid and gaseous hydrocarbons, water and water containing fluids such as Maple sap to be made into Maple syrup.

BACKGROUND TO THE INVENTION

Many engine fuel economy retrofit products and various devices have been developed in the past to improve fuel economy. Some devices are said to ionize fuel in order to improve fuel economy. One such device is disclosed in the International application published under the number WO 00/15957.

Other types of fuel conditioning systems such as magnets that are attached to the fuel line produce a magnetic field adjacent to the fuel line. Such a method and apparatus is disclosed in U.S. Pat. Nos. 5,080,080 and 5,271,369. U.S. Pat. No. 4,572,145 also describes a magnetic device using a magnet which is embedded in a U shaped body of non magnetic material which may be retrofitted on the fuel line.

Due to the wide range of fuel types, qualities, temperatures and flow rates, a magnetic system is unable to properly condition the fuel efficiently.

Another type of fuel conditioning method is by the insertion of a single or multiple pills of various types in the fuel reservoir. Their main problem is that, in order to increase engine performance and reduce gas consumption of internal combustion engines, a pill must be deposited in the reservoir at every filling of the reservoir. The dissolution of the pill can produce crystallization inside the gas line thus creating a blockage. An omission to insert a pill during a filling will result in no benefits in performance and no reduction in fuel savings.

One other known method and device is by passing the fuel through a warming or heating device in order to theoretically create a better combustion of the said fuel. This method and device has its drawback. As with the fixed magnet(s) the wide range of fuel types, qualities, temperature variants and flow rates do not always produce the right conditions to generate increased engine performance reduce pollutants and reduce fuel consumption.

None of the above devices or methods are easily adaptable for different fluids. There is therefore a need for a fluid conditioning or fluid treatment device which can be used not only for vehicle fuel but also for other fluids.

SUMMARY OF THE INVENTION apparatus for conditioning fluid flowing through a conduit. Two coils are coiled around the conduit at different locations and connected to a circuit which generates square wave signals which are alternately fed to the two coils. One pulse is fed to one coil and the next pulse is fed to the other coil. The fluid in the conduit may be any hydrocarbon based fuel, oil, or liquid. The treatment of the present invention has also been used with conduits containing water, and Maple sap. In the case of water, changes in the hardness of the water occurred, and in the case of Maple sap, less energy was required to convert the sap to Maple syrup. These surprising results cannot be explained in terms of ionization, but may be due to vaporization of the water molecules; in any event, the applicants do not wish to be bound by any specific theory as to the results obtained.

In a first embodiment the present invention provides a device for treatment of a fluid flowing through a conduit, the device comprising:
 a first coil wound around the conduit at a first location,
 a second coil wound around the conduit at a second location adjacent to the first location,
 a circuit which produces a first signal for the first coil and a second signal for the second coil,
wherein
 both the first and second signals are periodic,
 the first signal is alternated with the second signal, and
 the coils are connected to the circuit.

In a second embodiment, the present invention provides a method of treating fluids flowing through a conduit, the method comprising:
 (a) providing a first and a second coil,
 (b) placing each coil at a different location on the conduit,
 (c) generating a first and a second periodic signal, and
 (d) feeding the first signal to the first coil and feeding the second signal to the second coil alternately. Preferably the frequency of the first and second signals are ramped between a first frequency and a second frequency recurrently over a predetermined period of time.

BRIEF DESCRIPTION OF THE DRAWINGS

A better understanding of the invention may be obtained by reading the detailed description of the invention below, in conjunction with the following drawings, in which.

DETAILED DESCRIPTION OF THE INVENTION

Figure 1:
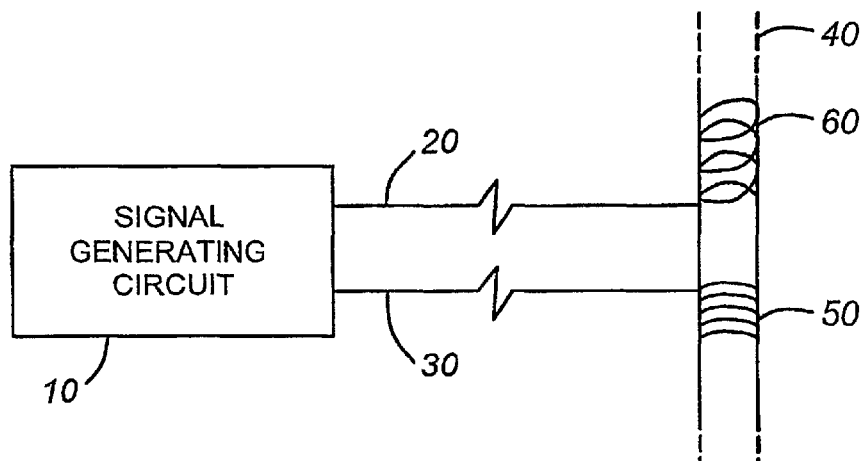
FIG. 1 is a block diagram of an embodiment of the invention.

Referring to FIG. 1, a block diagram of an embodiment of the invention is illustrated. A signal generating circuit 10 is attached to a first wire 20 and a second wire 30 which are coiled about a conduit 40, in which a fluid flows. Preferably, wires 20 and 30 are coiled around conduit 40 into coils 50 and 60. The coils 50 and 60 may be coiled in the same or different directions, that is, coil 50 may be coiled in a clockwise direction while coil 60 may be coiled in a counter clockwise direction. Alternatively, the coils may be wound in the same direction. Also the coils may be wound either toward or away from each other.

Figure 2:
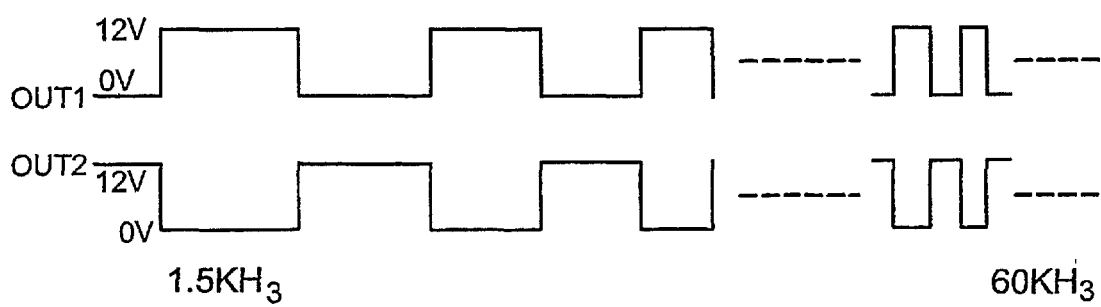
FIG. 2 is a diagram of the two periodic signals.

The signal generating circuit 10 produces two output signals, one for each coil. Experience has shown that these periodic signals should preferably be square waves, as shown in FIG. 2. Also as shown in FIG. 2, the two signals are alternated with one another. This means that, if the first signal is HI, then the second signal must be LO, and vice versa.

Ideally, the two signals will nave similar but varying frequencies. Experiments have noted that repeatedly ramping these frequencies from a low value to a high value within a period of time produces the best results.

The invention can be practised and applied to a variety of fluids flowing through the conduit. For automotive fuel, it has been found that ramping the signal frequency from 1.5 kHz to 30 kHz within 30 seconds produces beneficial results such as increased engine performance and a decrease in pollutant emissions. For this automotive application, a peak value of 12V is applied to the coils, with a 50% duty cycle.

Figure 3:
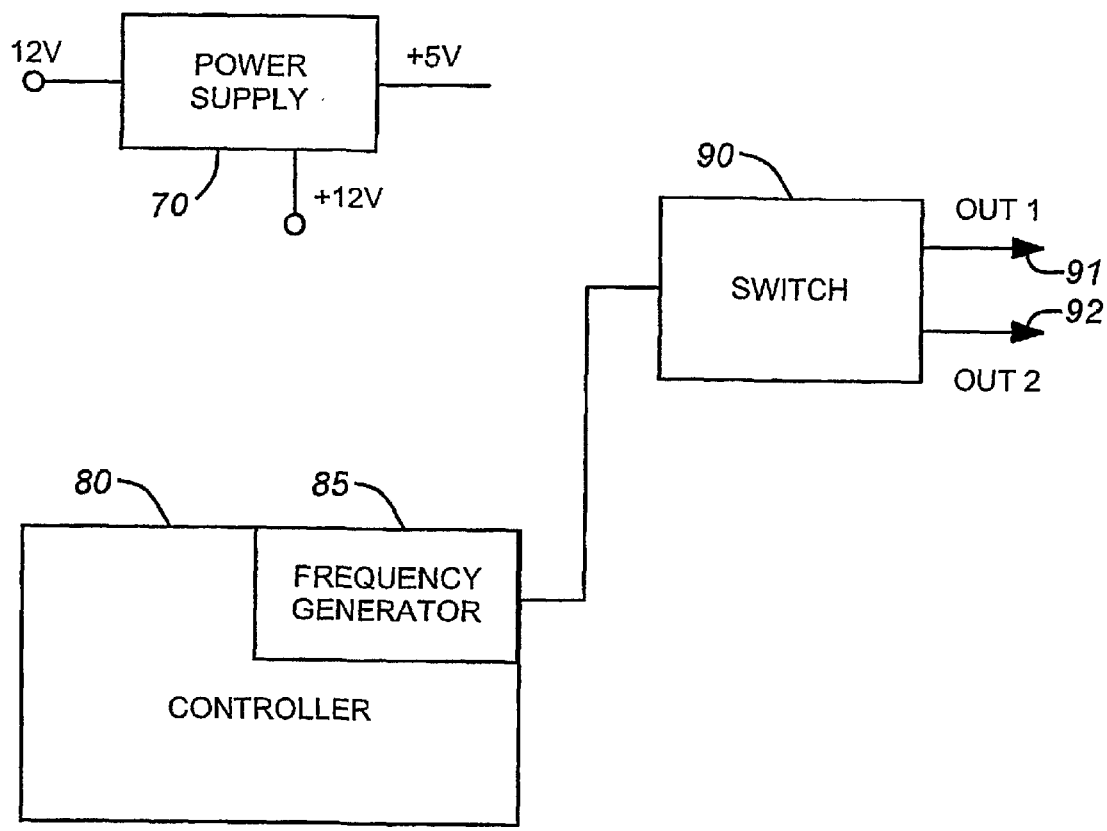
FIG. 3 is a block diagram of the signal generating circuit.

FIG. 3 is a block diagram of the signal generating circuit of FIG. 1. A power supply 70 is driven with 12 volts from a vehicle battery and charging system, not shown, and generates smoothed 12 volts D.C., and 5 volts D.C. Preferably, a diode is in series with the input 12 volts to prevent improper connection of the battery polarity, and a suitable fuse prevents overload damage to the internal circuits. A LED can be included to indicate when power is applied to the circuit. Voltages from the power supply are fed to the controller 80, and the switch 90. The controller 80 includes a frequency generator 85 for operating the switch 90 which connects the coils 40 and 50 to the 12 volt supply from power supply 70. The controller 80 controls the frequency ramping of the frequency generator 85. As mentioned frequencies between 1.5 KHz and 60 KHz have been successfully used, and are unlikely to interfere with any automotive equipment. The range of frequencies ramped may be within or greater than the frequencies mentioned above. Also the period of time to ramp from the low to the high frequency chosen may be longer or shorter than 30 seconds.

Figure 4:
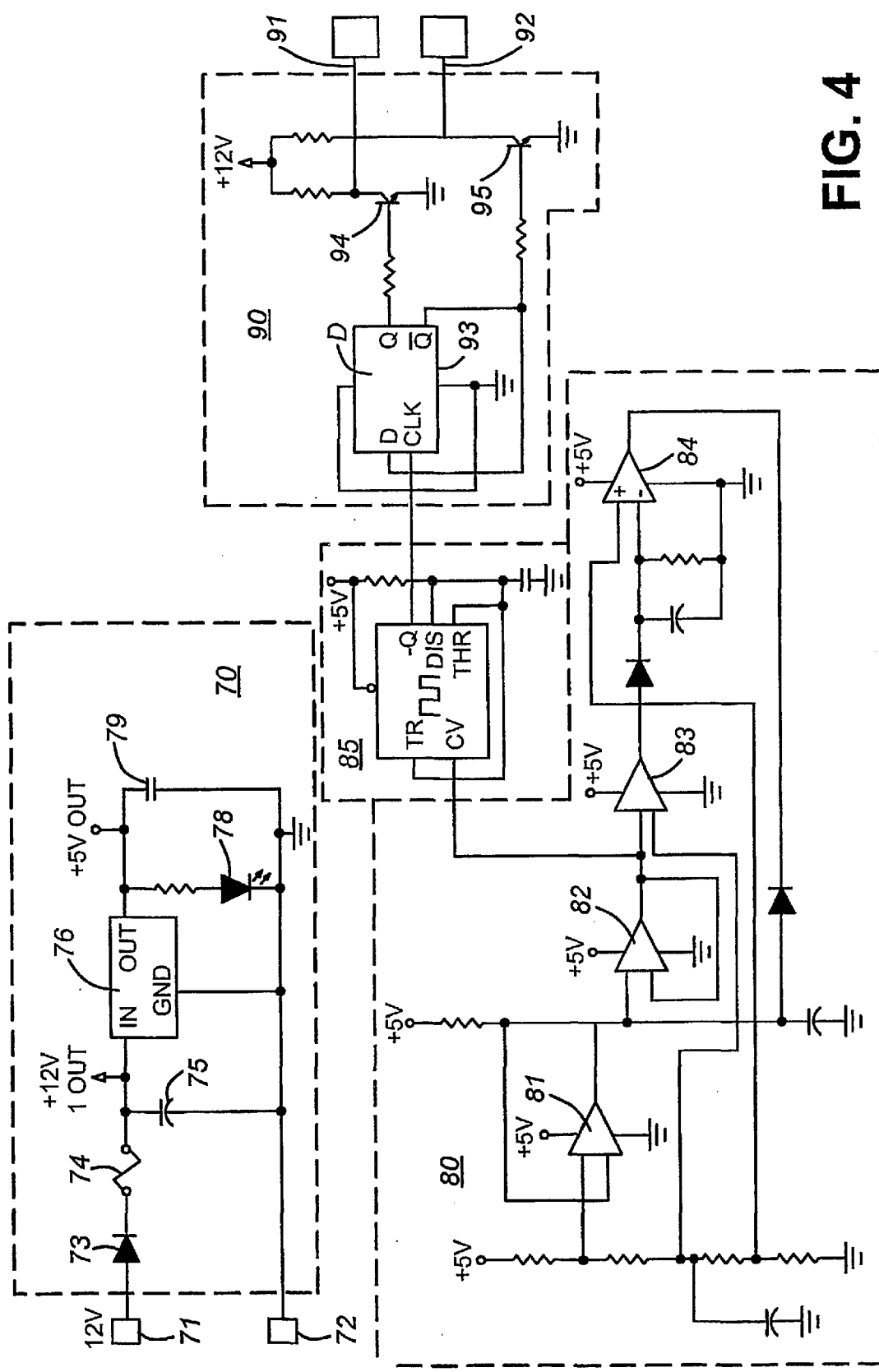
FIG. 4 is a circuit diagram of the signal generating circuit.

FIG. 4 is a schematic circuit of an actual working model of the signal generating circuit of FIG. 1, and FIG. 3. As before, the three main components of the circuit are a power supply 70, a controller 80 a frequency generator 85, and a switch 90. Power supply 70 receives 12 volt D.C. on terminals 71 and 72, and is connected by a diode 73 to prevent reverse polarity being applied to the filter capacitor 75. A fuse 74 is connected in series to further protect the power supply from excessive current being drawn from the 12 volt supply. A terminal labelled 12v out supplies power to the switch 90 as hereinafter discussed. A voltage reduction circuit 76 provides regulated 5v out after being smoothed by capacitor 79. An LED 78 is included to indicate when power is applied to the controller 80 and the switch 90. The amplifiers 81, 82, 83, and 84 of controller 80 generate a variable voltage ramping signal which is fed to the frequency generator 85 which drives D flipflop 93 which alternately turns off transistors 94 and 95, such that when one transistor is on the other is off. The collectors of transistors 94 and 95 are connected to the Q and Q outputs of flipflop 93 respectively. When transistor 94 is conductive the voltage output on line 91 is 0v and when transistor 94 is nonconductive, the voltage output on line 91 is substantially 12v. Transistor 95 is of course turned on when transistor 94 is turned off since the outputs Q and /Q are complementary. Thus the square wave ramped frequency signal is switched alternately between outputs 91 and 92.

The circuit of FIG. 4 has been tested on a variety of fluids. When connected to coils wrapped around the fuel line of a diesel highway tractor fuel consumption was reduced by several hundred Canadian dollars per week amounting to approximately 24% savings in fuel costs. Similar energy savings have been observed with other applications. Significant reductions in engine emissions have also been documented.

A person understanding the above-described invention may now conceive of alternative designs, using the principles described herein. All such designs which fall within the scope of the claims appended hereto are considered to be part of the present invention.

We claim:

1. A device for treatment of a fluid flowing through a fluid conduit, the device comprising:
   a first wire element able to be coiled around the fluid conduit at a first location,
   a second wire element able to be coiled around the fluid conduit at a respective second location,
   a circuit which is able to produce first and second square wave signals for respective transmission through the first coil and the second coil,
   wherein
      the coils are each connected to the circuit by a respective single connection,
      the first coil is wrapped around the conduit in a first direction,
      the second coil is wrapped around the conduit in a second direction,
      the first direction is opposite the second direction, and
      the circuit is configured such that when the signals are transmitted through the coils both the first and second signals are periodic, and
   the first signal is alternated with the second signal.

2. A device for treatment of a fluid flowing through a fluid conduit, the device comprising:
   a first wire element able to be coiled around a conduit at a first location,
   a second wire element able to be coiled around a conduit at a respective second location,
   a circuit which is able to produce first and second square wave signals for respective transmission through the first coil and the second coil,
   wherein
      the coils are each connected to the circuit by a respective single connection and the circuit is configured such that when the signals are transmitted through the coils both the first and second signals are periodic,
      the first signal is alternated with the second signal,
      the first signal and the second signal each have a respective frequency, and
      the frequencies are ramped between a first frequency and a second frequency.

3. A device as defined in claim 2 wherein the first signal has a frequency similar to the second signal.

4. A device as defined in claim 2 wherein the frequencies are able to be ramped between 1.5 kHz and 60 kHz.

5. A device as defined in claim 3 wherein the circuit is able to produce signals having a frequency which repeatedly ramps from 1.5 kHz to 60 kHz within a predetermined time period.

6. A device as defined in claim 5 wherein the predetermined time period is 30 seconds.

7. A device for treatment of a fluid flowing through a fluid conduit, the device comprising:
   a first wire element able to be coiled around the conduit a first location,
   a second wire element able to be coiled around the conduit at a respective second location,
   a circuit which is able to produce first and second square wave signals for respective transmission through the first coil and the second coil,
   wherein
      the coils are each connected to the circuit by a respective single connection,
      the first coil is wrapped around the conduit in a first direction,
      the second coil is wrapped around the conduit in a second direction, the first direction is opposite the second direction, and
the circuit is configured such that when the signals are transmitted through the coils both the first and second signals are periodic, the first signal being alternated with the second signal, the first signal and the second signal each have a respective frequency, and the frequencies are ramped between a first frequency and a second frequency.

8. A device as defined in claim 7 wherein the first signal has a frequency similar to the second signal.

9. A device as defined in claim 8 wherein the frequencies are able to be ramped between 1.5 kHz and 60 kHz.

10. A device as defined in claim 8 wherein the circuit is adapted to produce signals having a frequency which repeatedly ramps from 1.5 kHz to 60 kHz within a predetermined time period.

11. A device as defined in claim 10 wherein the predetermined time period is 30 seconds.

12. A device for treatment of water flowing through a water conduit, the device comprising:

said water conduit, a first coil wrapped around the conduit at a first location, a second coil wrapped around a conduit at a respective second location, a circuit which is able to produce first and second square wave signals for respective transmission through the first coil and the second coil, wherein
   each coil is connected to the circuit by a respective single connection,
   the first coil is wrapped around the conduit in a first direction,
   the second coil is wrapped around the conduit in a second direction,
   the first direction is opposite the second direction, and
   the circuit is configured such that when the signals are transmitted through the coils both the first and second signals are periodic, and
the first signal is alternated with the second signal.

13. A device for treatment of water flowing through a water conduit, the device comprising:

said water conduit, a first coil wrapped around the conduit at a first location, a second coil wrapped around the conduit at a respective second location, a circuit which is able to produce first and second square wave signals for respective transmission through the first coil and the second coil, wherein
   the coils are each connected to the circuit by a respective single connection, and
   the circuit is configured such that when the signals are transmitted through the coils both the first and second signals are periodic,
the first signal is alternated with the second signal,
the first signal and the second signal each have respective frequency, and
the frequencies are ramped between a first frequency and a second frequency.

14. A device as in claim 13 wherein the first signal has a frequency similar to the second signal.

15. A device as in claim 14 wherein the frequencies are ramped between 1.5 kHz and 60 kHz.

16. A device as in claim 14 wherein the signals have a frequency which repeatedly ramps from 1.5 kHz to 60 kHz within a predetermined time period.

17. A device as in claim 16 wherein the predetermined time period is 30 seconds.

18. A device for treatment of water flowing through a conduit, the device comprising:

said water conduit, a first coil able to be wrapped around the conduit at a first location, a second coil able to be wrapped around the conduit at a respective second location, a circuit which is able to produce first and second square wave signals for respective transmission through the first coil and the second coil, wherein
   the coils are each connected to the circuit by a respective single connection,
   the first coil is wrapped around the conduit in a first direction,
   the second coil is wrapped around the conduit in a second direction,
   the first direction is opposite the second direction, and
   the circuit is configured such that when the signals are transmitted through the coils both the first and second signals are periodic,
the first signal is alternated with the second signal,
the first signal and the second signal each have a respective frequency, and
the frequencies are ramped between a first frequency and a second frequency.

19. A device as in claim 18 wherein the first signal has a frequency similar to the second signal.

20. A device as in claim 19 wherein the frequencies are ramped between 1.5 kHz and 60 kHz.

21. A device as in claim 19 wherein the signals have a frequency which repeatedly ramps from 1.5 kHz to 60 kHz within a predetermined time period.

22. A device as in claim 21 wherein the predetermined time period is 30 seconds.

23. A method of treating water flowing through a water conduit, the method comprising:

(a) generating a first and a second periodic square wave signal, the first signal being alternated with the second signal, and (b) transmitting the first signal to a first, single terminal coil and transmitting the second signal to a second, single terminal coil, each single terminal coil being wrapped around the water conduit at a different location, the first coil being wrapped around the water conduit in a first direction, the second coil being wrapped around the water conduit in a second direction, and the first direction being opposite the second direction.

24. A method of treating water flowing through a water conduit, the method comprising:

(a) generating a first and a second periodic square wave signal, the first signal being alternated with the second signal, and (b) transmitting the first signal to a first, single terminal coil and transmitting the second signal to a second, single terminal coil, each single terminal coil being wrapped around the water conduit at a different location, the first signal and the second signal each having a respective frequency, and the frequencies being ramped between a first frequency and a second frequency.

25. A method as defined in claim 24 wherein the first signal has a frequency similar to the second signal.

26. A method as defined in claim 25 wherein the frequencies are ramped between 1.5 kHz and 60 kHz.

27. A method a defined in claim 25 wherein the frequency of the signals repeatedly ramps from a first value to a second value within a predetermined period of time.

28. A method as defined in claim 27 wherein the first value is 1.5 kHz and the second value is 60 kHz.

29. A method as defined in claim 28 wherein the predetermined time period is 30 seconds.

30. A method of treating water flowing through a water conduit, the method comprising:

(a) generating a first and a second periodic square wave signal, the first signal being alternated with the second signal, and (b) transmitting the first signal to a first, single terminal coil and transmitting the second signal to a second, single terminal coil, each single terminal coil being wrapped around the water conduit at a different location, the first coil being wrapped around the water conduit in a first direction, the second coil being wrapped around the water conduit in a second direction, the first direction being opposite the second direction, the first signal and the second signal each have a respective frequency, and the frequencies are ramped between a first frequency and a second frequency.

31. A method as defined in claim 30 wherein the first signal has a frequency similar to the second signal.

32. A method as defined in claim 30 wherein the frequencies are ramped between 1.5 kHz and 60 kHz.

33. A method as defined in claim 30 wherein the frequency of the signal repeatedly ramps from a first value to a second value within a predetermined period of time.

34. A method as defined in claim 33 wherein the first value is 1.5 kHz and the second value is 60 kHz.

35. A method as defined in claim 34 wherein the predetermined time period is 30 seconds.

* * * * *